May 22, 1934.  E. B. KIRK  1,960,111
EYE TESTING DEVICE
Filed Nov. 26, 1928  2 Sheets-Sheet 1
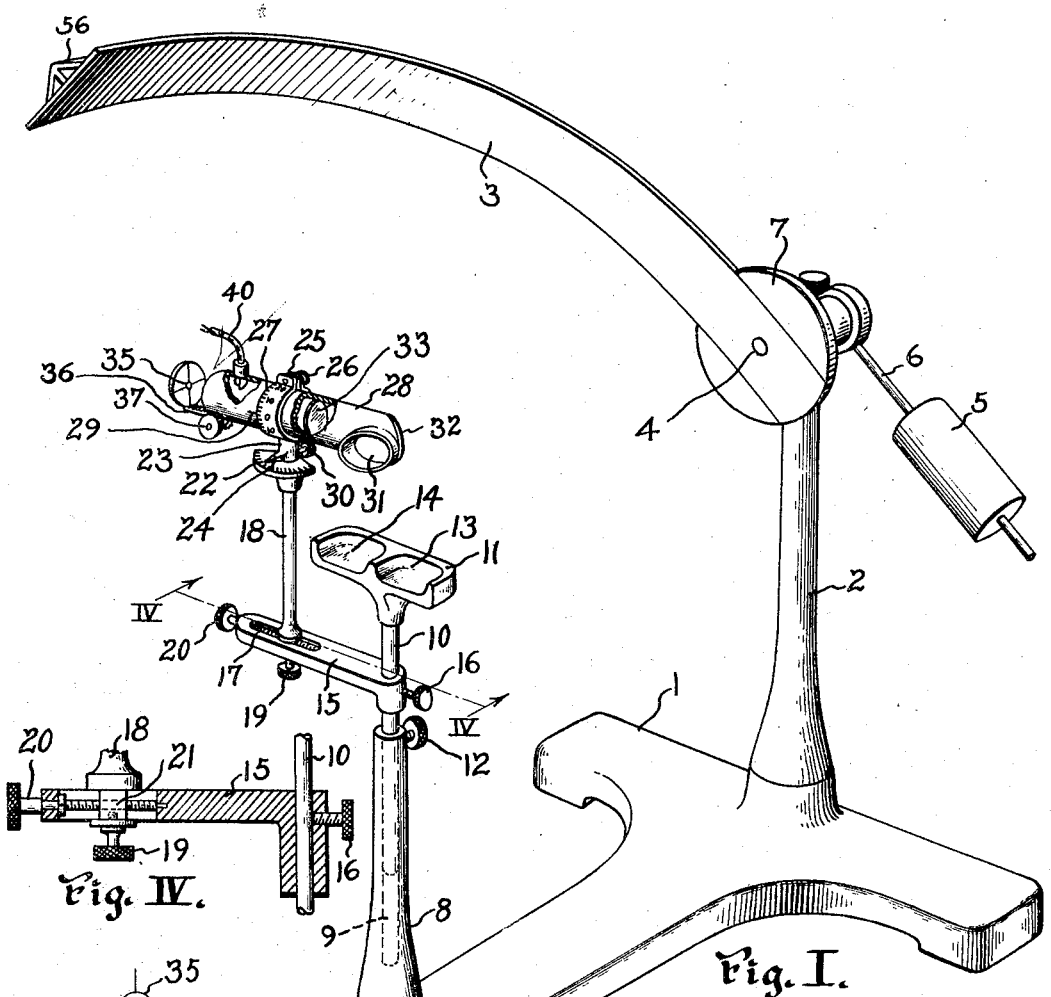
Inventor
Edward B. Kirk.
By Harry H. Styll
Attorney

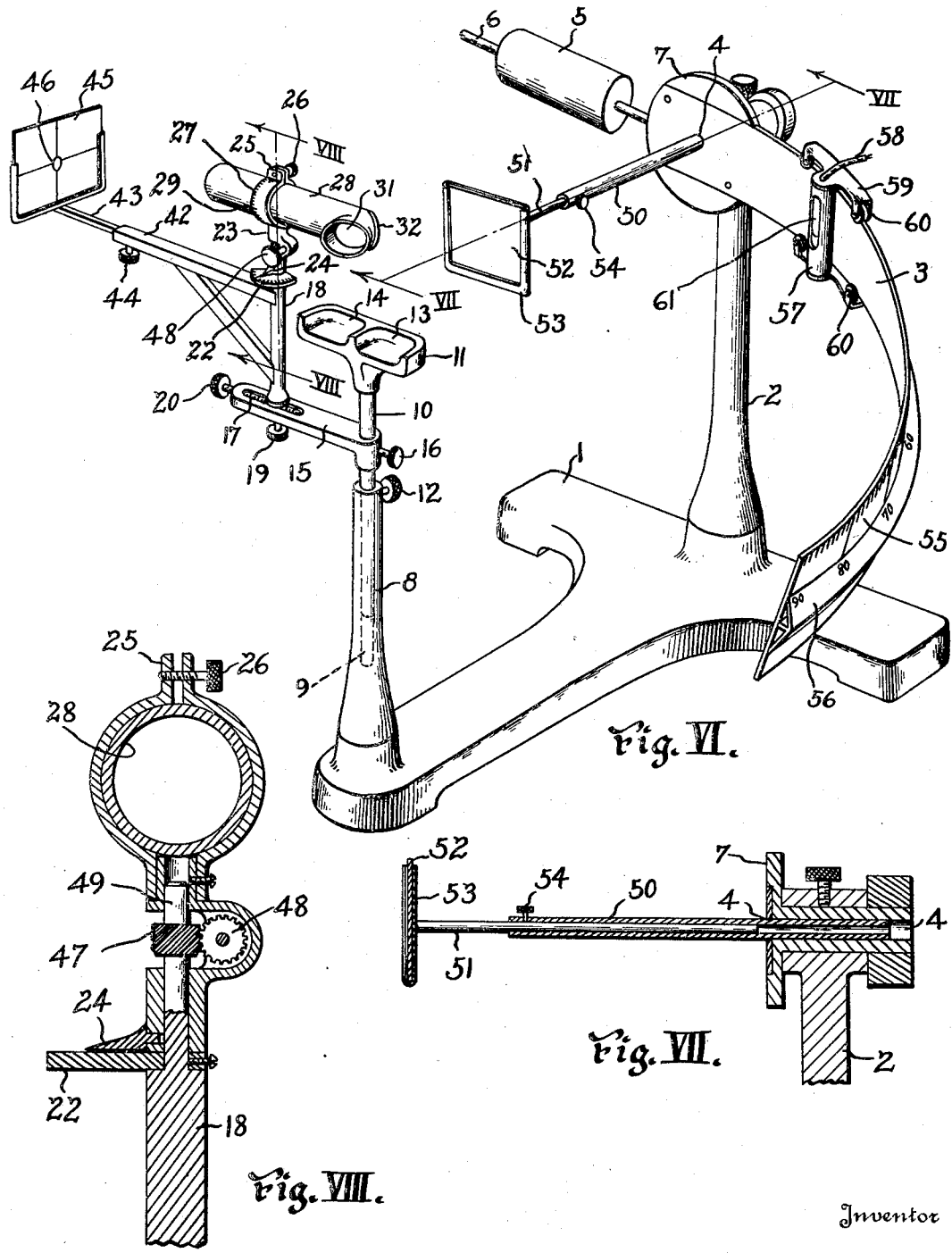

Patented May 22, 1934

1,960,111

UNITED STATES PATENT OFFICE 1,960,111

EYE TESTING DEVICE

Edward B. Kirk, Brookline, Mass., assignor to American Optical Company, Southbridge, Mass., a voluntary association of Massachusetts Application November 26, 1928, Serial No. 322,036

32 Claims. (Cl. 88—20)

This invention relates to improvements in eye testing devices and has particular reference to an improved perimeter or device for testing and measuring the field of vision, being a further improvement of the invention shown in my Patent Number 1,735,005, November 12, 1929.

This application contains common subject matter with my copending application filed on the same day as these presents.

The principal object of the invention is to provide improved means for obtaining binocular fixation of the patient's eyes during the test.

Another object of the invention is to provide improved means for measuring the central field of vision, the peripheral field of vision without limitation and for measuring Phorias and for plotting the field of vision of a patient showing the location of blind spots and other visual defects.

Another object of the invention is to provide improved means for adjusting the fixation spot of the eye not under test to coincide with the fixation object of the eye under test.

Another object of the invention is to provide improved means for stereoscopic tests such as superimposing one fixation object upon the other.

Another object of the invention is to provide improved means for measuring the general field of vision of a patient and locating accurately in said field the various defects of vision usual in such an examination.

Another object of the invention is to provide simple, efficient and economical means for carrying out all of the tests usual in perimetry.

Other objects and advantages of the invention will become apparent from the following description taken in connection with the accompanying drawings, and it will be apparent that many changes may be made in the details of construction and arrangement of parts without departing from the spirit of the invention as expressed in the accompanying claims. I, therefore, do not wish to be limited to the exact details of construction and arrangement of parts shown as the preferred forms only have been shown by way of illustration.

Referring to the drawings:

Fig. I is a perspective view of the device embodying the invention, a portion thereof being broken away and shown in section;

Fig. II is a top or plan view of the fixation tube of the device;

Fig. III is a cross section on line III—III of Fig. II;

Fig. IV is a cross section on line IV—IV of Fig. I;

Fig. V is a diagrammatic view showing the two fixation objects superimposed;

Fig. VI is a perspective view of the instrument embodying a modification of the invention;

Fig. VII is a cross section on line VII—VII of Fig. VI;

Fig. VIII is a cross section on line VIII—VIII of Fig. VI.

The measurement of the field of human vision is growing more and more important, particularly in the medical field in certain pathological cases, particularly Glaucoma, and the location and measurement of the blind spots of the eye usually termed Scotoma, and also in the measurement of the Phorias or muscular imbalance of the eye. The measurement of the field of vision of the human eye has been given the name of Perimetry, and the test prior to my invention has usually been made by testing the eye on a fixation spot. It was found in such tests that it was difficult to ascertain and measure the extent of the field of the eye under test due to the tendency of the eye not under test to rove around which, of course, would affect the eye being tested, tending to cause it to move in unison with the roving eye.

It is, therefore, one of the prime objects of my invention to provide means for fixing the eye not under test while the other eye is being tested in order to produce a more accurate chart of the field of vision than has hitherto been possible.

Referring to the drawings wherein similar reference characters denote corresponding parts throughout, the instrument comprises a stand or base 1, from which rises a standard or support 2, on which is pivoted the perimeter arc 3, formed in the arc of a circle, the center of which is substantially coincident with the position of the eye under observation in order that all portions of the observing surface shall be substantially equidistant from the eye. The perimeter arc 3 is pivoted at the point 4 which also acts as a fixation spot for the eye under test. The perimeter arc 3 is shown as a quadrant and is balanced by the weight 5 slidable on the rod 6 attached to the rotatable plate 7 which carries the perimeter arc 3. The object of the weight 5 is to exactly balance the weight of the perimeter arc 3 so that the arc 3 will remain in any set position at any desired angle.

Arising from the fore part of the base 1 is a second standard 8 which has the central bore

9 in which fits the stem 10 of the head support 11. It is clear that the head support may be raised and lowered by moving the stem 10 up and down in the bore 9. The stem 10 may be locked in any position by the set screw 12. The head rest 11 has two chin rest sections 13 and 14 hollowed out to fit the chin and so located that the eye on the side under test will align with the fixation object 4. The chin resting in the cavity 13 when the left eye is under test and in the cavity 14 when the right eye is under test. The head rest 11 may be raised or lowered so as to bring the eye under test vertically in line with the fixation object 4.

Pivoted on the stem 10 is the arm 15 which may be raised or lowered on the stem as desired, being locked in place by the screw 16. It will be understood that the arm 15 may be swung in desired angular relation with the stem 10. The arm 15 has a longitudinal slot 17 into which fits a vertical post 18, being locked in place by the set screw 19. Extending into the slot 17 in the outer end of the arm 15 is a screw 20. The body of the screw 20 is threaded and goes through the section 21 of the post 18. It is clear that if the screw 19 is loosened the post 18 may be moved back and forth in the slot 17 merely by turning the screw 20.

On the post 18 is a circular scale 22. Above the scale 22 is a sleeve 23 rotatably mounted on the post 18 and having the scale pointer 24. The sleeve 23 carries a split band 25 held in position by the screw 26. The band 25 also carries the circular scale 27. Embraced within the band 25 is the fixation tube 28 which bears on its surface the scale mark 29 registering with the scale 27. The fixation tube may be rotated in the band 25 and it may also be swung in a horizontal plane on the sleeve 23 bearing on the post 18, the measurement of the swing in the horizontal field being by means of the scale 22 and pointer 24 and that in the band 25 by means of the scale pointer 29 and scale 27. The sleeve 23 is locked in desired position by means of the set screw 30. Friction is brought to bear on the fixation tube 28 within the band 25 by means of the set screw 26. One end of the tube 28 is provided with the eye opening 31 in line with which is the inclined reflector or mirror 32. Intermediate the ends of the tube 28 is a plus lens 33. At the end of the tube 28 opposite from the mirror 32 is placed the chart 34 bearing the fixation object 35. This chart is carried by a rack member 36 slidable in guides in the tube 28. The rack is moved back and forth longitudinally of the tube 28 by the pinion 37. It will be clear that by longitudinal movement of the chart 34 by means of the rack and pinion 36 and 37 the proper focus of the chart through the lens may be obtained. It will also be seen that the eye looking through the opening 31 in the tube will see the scale on the chart 34 by means of the inclined mirror 32. An electric bulb 38 is supported within the tube 28 by means of the nipple 39 and is connected with the electric leads 40 to a source of electric current. There is a reflector shield 41 over the bulb 38 which reflects the light on the object 35 on the chart 34. The light of the bulb 38 is of the same intensity as that which illuminates the perimeter arc 3.

It will be clear that the arm 15 which is shown on the left hand side may be rotated so as to be on the right hand side of the eye piece by loosening the screw 16. In this way the fixation for either eye may be adjusted. By movement of the tube 28 on the sleeve 23 and in the band 25 the fixation object 35 may be so adjusted that it will coincide with the fixation object 4 as shown in Fig. V. This movement is indicative of the phoria or imbalance of the eye which is measured by the scales 22 and 27. The tube 28 may be adjusted to the proper height vertically by loosening the screw 16 and moving the arm 15 up or down as desired on the stem 10. The sight opening may be aligned with the eye in the horizontal field by movement of the post 18 in the slot 17.

It will be noted that when the tube 28 is swung from the right hand side of the instrument to occupy a similar position on the left hand side of the instrument, the eye opening 31 will be on the side opposite the eye. This can be adjusted to be brought in line with the eye by turning the tube 38 in the band 25. A scale similar to 27 is on the opposite side of the band to take care of the readings on that side, so the fixation tube may be used either on the right hand or on the left hand side of the head rest in exactly the same way.

Referring to Fig. VI, the base 1 and the standards 2 and 8 are the same as in Fig. I, as well as the head rest 1 and the stem 10. The post 18 which fits in the arm 15 is similar to that shown in Fig. I and is provided with a bracket 42 carrying the slide arm 43 held in place by the set screw 44. The arm 43 carries the chart 45 having a fixation object 46 similar to the fixation object 35 of Fig. I. The chart 45 may be moved longitudinally towards and away from the post 18 on the arm 43 and locked in desired position by the screw 44. The tube 28 is again supported by the band 25 on the sleeve 23 which is rotatable on the post 18 as in Fig. I. In the sleeve 23 is located the turning mechanism indicated in Fig. VIII. This comprises a spiral gear 47 and a spiral pinion 48. The gear 47 is secured to the reduced end 49 of the post 18. By turning the pinion 48 the tube 28 is angled with respect to the chart 45 in a horizontal plane.

The tube 28 in Fig. VI has the eye opening 31 and the mirror 32 as in Fig. I but there is no lens 33 or lamp 38 within the tube 28 and the chart 45 is not carried by a rack and pinion as is the chart 34 in Fig. I. It will be clear that the device shown in Fig. VI can be adjusted to be used on the right hand side as well as on the left hand side of the instrument as well as the device shown in Fig. I. The tube 28 is held in the band 25 as in Fig. I and may be adjusted to height vertically and to the position of the eye horizontally.

Passing through the pivot opening 4 of the perimeter arc 3 of the device shown in Fig. VI is the tubular arm 50 in which slides the rod 51 carrying the chart 52 held in the chart holder 53. The rod 51 is longitudinally slidable in the tube 50 and is locked in place by the set screw 54. The chart 53 is adjustable back and forth with relation to the head rest 1 and may be used for supporting various devices that the operator is desirous of having the patient look at at certain desired distances. This is particularly adaptable in cases of measuring visual acuity. The outer side of the perimeter arc 3 is graduated at 55 to indicate the degrees from the center of the arc. The arc is strengthened by the rib 56. Slidable on the perimeter arc 3 in Fig. VI is the lamp box 57 containing an electric bulb fed by the lead 58 leading to a convenient source of electric power. The lamp box is carried by the carrier 59 having the wheels 60 running on the edges of the arc 3. This lamp box may be moved by hand in desired position along the perimeter arc 3, and any desired test chart may be placed in the opening 61 of the lamp box 57 and may be illuminated or not as desired.

The operation of the device has been described in connection with the details above, but in general is as follows: The head rest 11 is adjusted to height to bring the patient's eye to be tested vertically in line with the fixation object 4. The tube 28 is then placed in position before the patient's eye not under test either on the right or left hand side of the head rest, as desired and adjustment is made to position it to the height of the patient's eye not under test through the screw 16 or horizontally in line with the said patient's eye through the slot 17. Then the chart 34 is adjusted by the rack and pinion 36 and 37 until it is superimposed in the patient's eye over the fixation point 4 as shown in Fig. V. The arc 3 may be moved in any desired angle where it will remain in place due to the balance weight 5. The lamp 57 may be moved along the arc 3 by hand showing the range of the patient's eye in any meridian which the arc 3 occupies. The position on the arc is read by the degree scale 55. It is not necessary, however, to use the lamp housing 57, as a fixation object such as a white dot on the end of a small rod may be held in the hand of the operator and moved along the arc 3, which test is usually preferred by most practitioners, the reading being taken by referring to the degree scale 55 on the back of the arc 3.

A chart may be and usually is placed on the back of the plate 7 and the readings set down. This may be done automatically or manually as is the usual custom in prior art devices. The fixation objects 35 and 46 may be made in many different desirable forms. For instance, it may be a cross which can be superimposed upon the circle of the fixation object 4, or if desired the chart could have a bird cage and the point 4 could be made in the form of a bird and adjustment made to give the effect of placing the bird in the bird cage, which is a favorite method of making stereoscopic tests.

From the foregoing description it will be seen that I have provided simple, efficient and economical means for making the usual perimetric tests with a binocular fixation of the patient's eyes, as well as providing for all of the tests usual in prior art perimeters.

Having described my invention, I claim:

1. In a device of the character described, a head support, a member having a fixation object aligned with the eye under test as positioned by the head support, a tubular member having an eye opening supported in line with the eye not under test, said tube extending in a line normal to the axis of the eye opening and away from the line of vision of the eye under test, an inclined reflector behind the opening adapted to reflect an image of an object aligned with the axis of the tube into the eye not under test, a lens in the tube intermediate its ends, and a member having a fixation object alinged with the axis of the tube.

2. In a device of the character described, a head support, a member having a fixation object aligned with the eye under test as positioned by the head support, a tubular member having an eye opening supported in line with the eye not under test, said tube extending in a line normal to the axis of the eye opening and away from the line of vision of the eye under test, an inclined reflector behind the opening adapted to reflect an image of an object aligned with the axis of the tube into the eye not under test, a lens in the tube intermediate its ends, a member having a fixation object beyond the lens and aligned with the axis of the tube, and means to move said member back and forth in said axial direction.

3. In a device of the character described, a head support, a member having a fixation object alinged with the eye under test as positioned by the head support, a tubular member having an eye opening supported in line with the eye not under test, said tube extend'ng in a line normal to the axis of the eye opening and away from the line of vision of the eye under test, an inclined reflector behind the opening adapted to reflect an image of an object aligned with the axis of the tube into the eye not under test, a lens in the tube intermediate its ends, and a member having a fixation object aligned with the axis of the tube beyond the lens and supported by the tube.

4. In a device of the character described, a head support, a member having a fixation object aligned with the eye under test as positioned by the head support, a tubular member having an eye opening supported in line with the eye not under test, said tube extending in a line normal to the axis of the eye opening and away from the line of vis'on of the eye under test, an inclined reflector behind the opening adapted to reflect an image of an object aligned with the axis of the tube into the eye not under test, a lens in the tube intermediate its ends, a member having a fixation object aligned with the axis of the tube and supported thereby beyond the lens, and means to move said member back and forth in said axial direction.

5. In a device of the character described, a head support, a member having a fixation object aligned with the eye under test as positioned by the head support, a tubular member having an eye opening supported in line with the eye not under test, said tube extending in a line normal to the axis of the eye opening and away from the line of vision of the eye under test, an inclined reflector behind the opening adapted to reflect an image of an object aligned with the axis of the tube into the eye not under test, a lens in the tube intermediate its ends, a member having a fixation object aligned with the axis of the tube and beyond the lens, and rack and pinion means to move said member back and forth in said axial direction.

6. In a device of the character described, a head support, a member having a fixation object aligned with the eye under test as positioned by the head support, a tubular member having an eye opening supported in line with the eye not under test, said tube extending in a line normal to the axis of the eye opening and away from the line of vision of the eye under test, an inclined reflector behind the opening adapted to reflect an image of an object aligned with the axis of the tube into the eye not under test, a member having a fixation object aligned with the axis of the tube beyond the reflector, and a light source in the tube intermediate the reflector and said member adapted to illuminate said fixation object.

7. In a device of the character described, a head support, a member having a fixation object aligned with the eye under test as positioned by the head support, a tubular member having an eye opening supported in line with the eye not under test, said tube extending in a line normal to the axis of the eye opening and away from the line of vision of the eye under test, an inclined reflector behind the opening adapted to reflect an image of an object aligned with the axis of the tube into the eye not under test, a member having a fixation object aligned with the axis of the tube beyond the reflector and an electric light in the tube intermediate the reflector and said member adapted to illuminate said fixation object.

8. In a device of the character described, a head support, a member having a fixation object aligned with the eye under test as positioned by the head support, a tubular member having an eye opening supported in line with the eye not under test, said tube extending in a line normal to the axis of the eye opening and away from the line of vision of the eye under test, an inclined reflector behind the opening adapted to reflect an image of an object aligned with the axis of the tube into the eye not under test, a member having a fixation object aligned with the axis of the tube beyond the reflector, a light source in the tube intermediate the reflector and said member adapted to illuminate said fixation object, and a reflector aligned with the light source adapted to reflect the rays therefrom onto said fixation object.

9. In combination with a head rest and an aligned fixation object for the eye under test, a tubular member having an eye opening supported in line with the eye not under test, said tube extending in a line normal to the axis of the eye opening and away from the line of vision of the eye under test, an inclined reflector behind the opening adapted to reflect an image of an object aligned with the axis of the tube into the eye not under test, a member having a fixation object aligned with the axis of the tube, a clamp member supporting the tube for rotative axial movement therein, and cooperating means on said clamp and tube to measure said movement.

10. In combination with a head rest and an aligned fixation object for the eye under test, a tubular member having an eye opening supported in line with the eye not under test, said tube extending in a line normal to the axis of the eye opening and away from the line of vision of the eye under test, an inclined reflector behind the opening adapted to reflect an image of an object aligned with the axis of the tube into the eye not under test, a member having a fixation object aligned with the axis of the tube, a clamp member supporting the tube for rotative axial movement therein, cooperative means on said clamp and tube to measure said movement, a support for the tube whereon it may rotate in a direction transverse to its axis, and means to measure said movement.

11. In combination with a head rest and an aligned fixation object for the eye under test, a tubular member having an eye opening supported in line with the eye not under test, said tube extending in a line normal to the axis of the eye opening and away from the line of vision of the eye under test, an inclined reflector behind the opening adapted to reflect an image of an object aligned with the axis of the tube into the eye not under test, a member having a fixation object aligned with the axis of the tube, a clamp member supporting the tube for rotative axial movement therein, cooperative means on said clamp and tube to measure said movement, means for supporting the tube whereby it may be rotated in a direction transverse to its axis, and means to measure said movement.

12. In combination with a head rest and an aligned fixation object for the eye under test, a tubular member having an eye opening supported in line with the eye not under test, said tube extending in a line normal to the axis of the eye opening and away from the line of vision of the eye under test, an inclined reflector behind the opening adapted to reflect an image of an object aligned with the axis of the tube into the eye not under test, a member having a fixation object aligned with the axis of the tube, an arm supporting the tubular member, an arm supporting the first arm, and means on the second arm whereby the first arm may be moved along the second arm towards or away from the head rest.

13. In combination with a head rest and an aligned fixation object for the eye under test, a tubular member having an eye opening supported in line with the eye not under test, said tube extending in a line normal to the axis of the eye opening and away from the line of vision of the eye under test, an inclined reflector behind the opening adapted to reflect an image of an object aligned with the axis of the tube into the eye not under test, a member having a fixation object aligned with the axis of the tube, an arm supporting the tubular member, an arm supporting the first arm, and screw means on the second arm whereby the first arm may be moved along the second arm towards or away from the head rest.

14. In combination with a head rest and an aligned fixation object for the eye under test, a tubular member having an eye opening supported in line with the eye not under test, said tube extending in a line normal to the axis of the eye opening and away from the line of vision of the eye under test, an inclined reflector behind the opening adapted to reflect an image of an object aligned with the axis of the tube into the eye not under test, a member having a fixation object aligned with the axis of the tube, an arm supporting the tubular member, an arm supporting the first arm, means on the second arm whereby the first arm may be moved along the second arm towards or away from the head rest, and means for locking the first arm on the second arm in desired position.

15. In a device of the character described, a head support, a member having a fixation object aligned with the eye under test as positioned by the head support, a tubular member having an eye opening supported in line with the eye not under test, said tube extending in a line normal to the axis of the eye opening and away from the line of vision of the eye under test, an inclined reflector behind the opening adapted to reflect an image of an object aligned with the axis of the tube into the eye not under test, a member having a fixation object aligned with the axis of the tube, and slide means connecting said member with the tube.

16. In a device of the character described, a head support, a member having a fixation object aligned with the eye under test as positioned by the head support, a tubular member having an eye opening supported in line with the eye not under test, said tube extending in a line normal to the axis of the eye opening and away from the line of vision of the eye under test, an inclined reflector behind the opening adapted to reflect an image of an object aligned with the axis of the tube into the eye not under test, a member having a fixation object aligned with the axis of the tube, and rack and pinion means for moving said member back and forth in said axial direction.

17. In combination with a head rest and an aligned fixation object for the eye under test, means for raising and lowering the head rest relative to the fixation object, an arm pivoted on the head rest support for movement in a horizontal plane, a second rod vertically supported on the first, means for moving the second rod longitudinally of the first, a sleeve on the second rod axially rotatable thereon, a clamping member on said sleeve, a tubular member in said clamp axially rotatable therein and having an eye opening supported in line with the eye not under test, said tube extending in a line normal to the axis of the eye opening and away from the line of vision of the eye under test, an inclined reflector behind the opening adapted to reflect an image of an object aligned with the axis of the tube into the eye not under test, a lens in the tube intermediate its ends, a member having a fixation object aligned with the axis of the tube, and means to move said member back and forth in said axial direction.

18. In combination with a head rest and an aligned fixation object for the eye under test, an arm pivotally supported on the head rest for rotative movement in a horizontal plane, an arm carried by the first arm and extending in a vertical plane, a third arm carried by the second arm and projecting transversely therefrom, a chart support on the third arm, a tubular member aligned with the chart having an eye opening aligned with the eye not under test as fixed by the head rest, the axis of said tube extending substantially parallel to the third arm, means in the tubular member for viewing the chart, means for supporting the tube so that it may be rotated in a horizontal plane, and means for supporting the tube so that it may be axially rotated in its support independent of the chart holding means.

19. In combination with a head rest and an aligned fixation object for the eye under test, an arm pivotally supported on the head rest for rotative movement in a horizontal plane, an arm carried by the first arm and extending in a vertical plane, a third arm carried by the second arm and extending transversely thereto, a slide on the third arm and a chart support on the slide, a tubular member aligned with the chart, having an eye opening aligned with the eye not under test as fixed by the head rest, the axis of said tube extending substantially parallel to the third arm, means in the tubular member for viewing the chart, means for supporting the tube so that it may be rotated in a horizontal plane, and means for supporting the tube so that it may be axially rotated in its support.

20. In combination with a head rest and an aligned fixation object for the eye under test, an arm pivotally supported on the head rest for rotative movement in a horizontal plane, an arm carried by the first arm and extending in a vertical plane, a third arm carried by the second arm and extending transversely thereto, a slide on the third arm, means to lock the slide in desired position, a chart support on the slide, a tubular member aligned with the chart, having an eye opening aligned with the eye not under test as fixed by the head rest, the axis of said tube extending substantially parallel to the third arm, means in the tubular member for viewing the chart, means for supporting the tube so that it may be rotated in a horizontal plane, and means for supporting the tube so that it may be axially rotated in its support.

21. In combination with a head rest and an aligned fixation object for the eye under test, a supporting arm pivotally secured to the head rest for rotative movement in a horizontal plane, a second arm supported by the first arm and extending vertically therefrom, a third arm supported by the second arm and extending transversely thereto, a slide on the third arm and a chart support on the slide, a tubular member having an eye opening facing the eye not under test as fixed by the head rest, the axis of the tube being substantially parallel to the third supporting arm, a support for the tube rotatable on the second arm so that the tube may move in a horizontal plane, a clamp support carried by the first support and embracing the tube so that it may be rotated axially therein, and an inclined reflector in the tube behind the eye opening adapted to reflect the image of an object aligned with the axis of the tube into the eye not under test.

22. In combination with a head rest and an aligned fixation object for the eye under test, a supporting arm pivotally secured to the head rest for rotative movement in a horizontal plane, a second arm supported by the first arm and extending vertically therefrom, a third arm supported by the second arm and extending transversely thereto, a slide on the third arm and a chart support on the slide, a tubular member having an eye opening facing the eye not under test as fixed by the head rest, the axis of the tube being substantially parallel to the third supporting arm, a support for the tube rotatable on the second arm so that the tube may move in a horizontal plane, a clamp support carried by the first support and embracing the tube so that it may be rotated axially therein, an inclined reflector in the tube behind the eye opening adapted to reflect the image of an object aligned with the axis of the tube into the eye not under test, scale means to indicate the movement of the tube in the horizontal plane, and scale means to indicate the axial movement of the tube in its clamp.

23. In combination with a head rest and an aligned fixation object for the eye under test, a supporting arm pivotally secured to the head rest for rotative movement in a horizontal plane, a second arm supported by the first arm and extending vertically therefrom, a third arm supported by the second arm and extending transversely thereto, a slide on the third arm and a chart support on the slide, a tubular member having an eye opening facing the eye not under test as fixed by the head rest, the axis of the tube being substantially parallel to the third supporting arm, a support for the tube rotatable on the second arm so that the tube may move in a horizontal plane, a clamp support carried by the first support and embracing the tube so that it may be rotated axially therein, an inclined reflector in the tube behind the eye opening adapted to reflect the image of an object aligned with the axis of the tube into the eye not under test, scale means to indicate the movement of the tube in the horizontal plane, scale means to indicate the axial movement of the tube in its clamp, means to lock the movement of the tube in desired position in the horizontal plane, and means to regulate the friction of the clamp around the tube.

24. In a device of the character described, a head support, a member having a fixation object aligned with the eye under test as positioned by the head support, an inclined reflector supported in line with the eye not under test, a fixation object for the eye not under test aligned with said reflector and said reflector adapted to reflect the image of said fixation object into the eye not under test, a lens located in the line of vision of the eye not under test and located between the said eye and said fixation object and means for altering the position of said fixation object relative to the lens.

25. In a device of the character described, a member having fixation means in substantial alignment with the eye under test and on which the said eye is adapted to be fixed, a support having an inclined light deflecting member in line with the eye not under test, fixation means on the support visible to the eye not under test by means of the light deflecting member, lens means between said fixation means and the eye not under test with which the fixation means may be moved into focus and means for altering the position of the fixation means relative to said lens means.

26. In a device of the character described, a field member movable about an axis coincident with the direct line of sight of an eye under test and having fixation means in substantial alignment with the eye under test, means for fixing the eye not under test including fixation means positioned out of the direct field of vision of the eye not under test, means positioned in line with the eye not under test to afford vision of the fixation means for said eye when the eye under test is fixed on its fixation means, lens means between the fixation means for the eye not under test and said eye with which the fixation means may be moved into focus and means for altering the distance of said fixation means relative to the lens means.

27. In a device of the character described, a member having fixation means visible to the eye under test, a support having an inclined light deflecting member thereon in line with the eye not under test, the longitudinal axis of the support extending in a line substantially normal to the direction of the sight line between the eye not under test and the deflector, said inclined light deflecting member being adapted to deflect an image of a fixation object in substantial alignment with the line of sight of the eye not under test as deflected by the deflecting means into the eye not under test and a lens located in the line of vision of the eye not under test between said eye and its fixation object with which the fixation object may be focused to obtain a clear image of said fixation object.

28. In a device of the character described, a member having a fixation object in substantial alignment with the eye under test, a hollow support having an inclined light deflecting member therein in line with the eye not under test, the longitudinal axis of said hollow support extending in a line substantially normal to the direction of the sight line between the eye not under test and the deflecting member, a fixation object positioned in line with the longitudinal axis of the hollow member to be visible to the eye not under test in said deflecting member, and lens means between said fixation object and the eye not under test with which the fixation object may be focused to obtain a clear image of said fixation object.

29. The combination of a screen within the direct field of vision of an eye of a subject, a support having a sight opening therein in line with the other eye, a light deflecting member in line with the sight opening, means having an object thereon in line with the light deflecting means to be visible to the eye aligned with the sight opening and for positioning an aerial image of said object on the screen before the first named eye and lens means between said object and eye with which the object may be focused to obtain a clear image of said object.

30. The combination of a relatively flat planed screen within the direct field of vision of an eye of a subject, a support having a sight opening therein in line with the other eye, a light deflecting member in line with the sight opening, means having an object thereon in line with the light deflecting means to be visible to the eye aligned with the sight opening and for positioning an aerial image of said object on the screen before the first named eye and lens means between said object and eye with which the object may be focused to obtain a clear image of said object.

31. The combination of a screen within the direct field of vision of an eye of a subject, a support having a sight opening therein in line with the other eye, a light deflecting member in line with the sight opening, means having an object thereon in line with the light deflecting means to be visible to the eye aligned with the sight opening and for positioning an aerial image of said object on the screen before the first named eye and lens means between said object and eye with which the object may be focused to obtain a clear image of said object and means for varying the position of the aerial image of the object relative to the screen.

32. The combination of a relatively flat planed screen within the direct field of vision of an eye of a subject, a support having a sight opening therein in line with the other eye, a light deflecting member in line with the sight opening, means having an object thereon in line with the light deflecting means to be visible to the eye aligned with the sight opening and for positioning an aerial image of said object on the screen before the first named eye and lens means between said object and eye with which the object may be focused to obtain a clear image of said object and means for varying the position of the aerial image of the object relative to the screen.

EDWARD B. KIRK.